United States Patent
Daultani et al.

(10) Patent No.: US 12,058,155 B2
(45) Date of Patent: Aug. 6, 2024

(54) ANOMALY DETERMINING SYSTEM, ANOMALY DETERMINING METHOD AND PROGRAM

(71) Applicant: RAKUTEN GROUP, INC., Tokyo (JP)

(72) Inventors: Dinesh Daultani, Tokyo (JP); Bruno Andre Charron, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 439 days.

(21) Appl. No.: 17/418,873

(22) PCT Filed: Sep. 29, 2020

(86) PCT No.: PCT/JP2020/037004
§ 371 (c)(1),
(2) Date: Jun. 28, 2021

(87) PCT Pub. No.: WO2022/070278
PCT Pub. Date: Apr. 7, 2022

(65) Prior Publication Data
US 2022/0311790 A1    Sep. 29, 2022

(51) Int. Cl.
H04L 29/06    (2006.01)
G06V 10/82    (2022.01)
H04L 9/40    (2022.01)

(52) U.S. Cl.
CPC .......... *H04L 63/1425* (2013.01); *G06V 10/82* (2022.01); *H04L 63/1408* (2013.01); *H04L 63/1433* (2013.01); *H04L 63/1466* (2013.01); *G05B 2219/33025* (2013.01)

(58) Field of Classification Search
None
See application file for complete search history.

(56) References Cited

U.S. PATENT DOCUMENTS

| 10,645,109 B1 | 5/2020 | Lin et al. | |
| 2019/0042761 A1* | 2/2019 | Wang | G06N 3/08 |

(Continued)

FOREIGN PATENT DOCUMENTS

| CN | 111131314 A | 5/2020 | |
| CN | 113748656 A * | 12/2021 | G06N 3/08 |

(Continued)

OTHER PUBLICATIONS

Jisheng Wang, "Deep Learning in Security—An Empirical Example in User & Entity Behavior Analytics (UEBA)", [online], Jun. 13, 2017, Databricks, [retrieved on Sep. 23, 2020], Internet <URL : https://www.youtube.com watch?v=aAhAJFk1OVc&t=19s> (Year: 2017).*

(Continued)

*Primary Examiner* — Andrew J Steinle
(74) *Attorney, Agent, or Firm* — HEA LAW PLLC

(57) ABSTRACT

An input data generation unit is configured to generate, based on log data indicating a log of a behavior of a user with respect to a given computer resource for each period, input data for the period, which is associated with the log data. A user probability data generation unit is configured to generate user probability data based on output obtained from a trained machine learning model when the input data is input to the trained machine learning model. An anomaly determination unit is configured to determine whether an anomaly has occurred in the behavior of the user during a latest period based on the user probability data generated based on the input data for the latest period and the user probability data generated based on the input data for a period before the latest period.

17 Claims, 11 Drawing Sheets

(56) References Cited

U.S. PATENT DOCUMENTS

| | | |
|---|---|---|
| 2019/0260787 A1 | 8/2019 | Zou |
| 2021/0006565 A1 | 1/2021 | Urata et al. |
| 2022/0311790 A1 | 9/2022 | Daultani et al. |

FOREIGN PATENT DOCUMENTS

| | | | |
|---|---|---|---|
| JP | 2010097342 A | | 4/2010 |
| JP | 2018206232 A | * | 12/2018 |
| JP | 2018206232 A | | 12/2018 |
| JP | 2019144693 A | | 8/2019 |
| JP | 7165830 B2 | | 11/2022 |

OTHER PUBLICATIONS

Office Action of Jan. 30, 2023, for corresponding TW Patent Application No. 110123570 with partial English translation, pp. 1-18.

Office Action of Oct. 19, 2021, for corresponding JP Patent Application No. 2021-543457 with partial English translation pp. 1-5.

Jisheng Wang, "Deep Learning in Security—An Empirical Example in User & Entity Behavior Analytics (UEBA)", [online], Jun. 13, 2017, Databricks, [retrieved on Sep. 23, 2020], Internet <URL : https://www.youtube.com/watch?v=aAhAJFk1OVc&t=19s> (See also the specification p. 1, line 10 to p. 2, line 14).

Wang, Jisheng, Deep Learning in Security—An Empirical Example in User & Entity Behavior Analytics (UEBA) [online], Databricks, Jun. 15, 2017, [Search Date Dec. 15, 2020], Internet <URL: https://www.slideshare.net/databricks/deep-learning-in-securityan-empirical-example-in-user-and-entity-behavior-analytics-with-dr-jishen-wang> (Cited in the International Search Report).

International Search Report for PCT/JP2020/037004 (See the transmittal letter).

Office Action of Mar. 5, 2024, for corresponding JP Patent Application No. 2022-077665, pp. 1-5.

* cited by examiner

FIG.8

| USER ID | |
|---|---|
| BEHAVIOR DATE DATA | |
| INPUT DATA | INPUT IMAGE GROUP |
| | TIME-SERIES INPUT DATA |

FIG.9

| USER ID | 0001 |
|---|---|
| BEHAVIOR DATE DATA | 2020/9/9 |
| PROBABILITY VALUE DATA | 60% | ns
ANOMALY DETERMINING SYSTEM, ANOMALY DETERMINING METHOD AND PROGRAM

CROSS REFERENCE TO RELATED APPLICATIONS

This application is a National Stage of International Application No. PCT/JP2020/037004 filed on Sep. 29, 2020. The contents of the above document is incorporated herein by reference in its entirety.

TECHNICAL FIELD

The present invention relates to an anomaly determining system, an anomaly determining method, and a program.

BACKGROUND ART

In recent years, a user and entity behavior analytics (UEBA) technology for analyzing a behavior of a user with respect to a computer resource has been attracting attention. Through use of the UEBA technology, it is possible to detect, for example, cyber attacks by a malicious hacker and an internal threat, such as a data leakage, by a malicious employee.

As an example of such a UEBA technology, in Patent Literature 1, there is described an access analysis system for determining validity of access through a network. In the technology described in Patent Literature 1, the validity of access through a network is determined based on: a result of analyzing the validity of a user based on characteristics of operations of a terminal by the user relating to the access through the network; and a result of analyzing normality of communication.

In addition, in Non Patent Literature 1, it is indicated that a convolutional neural network (CNN) is caused to learn a heat map that visualizes, regarding the plurality of users and the plurality of protocols, frequencies of access of the user via the protocol on a per-minute basis. In Non Patent Literature 1, it is also indicated that occurrence of an anomaly in the behavior of the user is detected based on output from the trained CNN corresponding to input of the heat map.

CITATION LIST

Patent Literature

[PTL 1] JP 2019-144693 A

Non Patent Literature

[NPL 1] Jisheng Wang, "Deep Learning In Security—An Empirical Example in User & Entity Behavior Analytics (UEBA)", [online], Jun. 13, 2017, Databricks, [retrieved on Sep. 23, 2020], Internet <URL https://www.youtube.com/watch?v=aAhAJFk1OVc&t=19s>

SUMMARY OF INVENTION

Technical Problem

It is naturally possible that a behavior of a user changes gradually and slowly while the user uses a computer resource on a daily basis.

However, in the technology described in Non Patent Literature 1, it is determined whether or not an anomaly has occurred in the behavior of the user based on the one-shot output from the trained CNN. Then, in this determination, consideration is not given to whether the output is generated by a sudden change in the behavior of the user or is finally reached as a result of the gradual and slow change in the behavior of the user.

For that reason, in the technology described in Non Patent Literature 1, there is such a fear that it may be erroneously determined that an anomaly has occurred in the behavior of the user even under a state in which the behavior of the user has changed gradually and slowly. This problem cannot be solved even through use of the technology described in Patent Literature 1.

The present invention has been made in view of the above-mentioned problem, and one of objects thereof is to provide an anomaly determining system, an anomaly determining method, and a program which are capable of properly determining occurrence of an anomaly in a behavior of a user.

Solution to Problem

According to one embodiment of the present invention, there is provided an anomaly determining system including: input data generation means for generating, for each of a plurality of periods, based on log data indicating a log of a behavior of a user with respect to a given computer resource for the each of the plurality of periods, input data for the each of the plurality of periods, which is associated with the log data; user probability data generation means for generating, based on output obtained from a trained model when the input data is input to the trained model, user probability data indicating a probability value of a probability that the log data associated with the input data indicates the log of the behavior of the user; and anomaly determination means for determining whether an anomaly has occurred in the behavior of the user during a latest period based on the user probability data generated based on the input data for the latest period and the user probability data generated based on the input data for a period before the latest period.

According to one aspect of the present invention, the anomaly determination means is configured to determine whether an anomaly has occurred in the behavior of the user based on whether a difference between a probability value indicated by the user probability data for the latest period and a probability value indicated by the user probability data for a period immediately before the period is larger than a predetermined threshold value.

As another example, the anomaly determination means is configured to determine whether an anomaly has occurred in the behavior of the user based on a probability value indicated by the user probability data for the latest period and a representative value of probability values indicated by pieces of user probability data for a predetermined number of periods before the period.

In this aspect, the anomaly determination means may be configured to determine whether an anomaly has occurred in the behavior of the user based on whether a difference between the probability value indicated by the user probability data for the latest period and the representative value is larger than a predetermined threshold value.

Further, according to one aspect of the present invention, the anomaly determining system further includes: statistical data generation means for generating statistical data indicating statistics of the behavior of the user during the period based on the log data for the period; and time-series input data generation means for generating time-series input data for the period, which includes the statistical data for a plurality of periods up to the period, and the input data generation means is configured to generate the input data for the period, which includes the time-series input data for the period.

In this aspect, the statistical data generation means may be configured to generate the statistical data indicating at least one of access frequency data indicating a number of accesses during the period for each of at least one given URL, first access time data indicating a first access time of access to the computer resource during the period, last access time data indicating a last access time of access to the computer resource during the period, access period data indicating an access period of access to the computer resource during the period, total upload data size data indicating a total size of data uploaded to the computer resource during the period, or total download data size data indicating a total size of data downloaded from the computer resource during the period.

Further, the input data generation means may be configured to generate the input data for the period, which further includes an input image that visualizes the behavior of the user indicated by the log data, which is generated based on the log data for the period.

In this aspect, the input image may be an image that visualizes a use status of the user regarding at least one of a given application or a given protocol.

Further, the input image may be a heat map that visualizes a per-minute use status on one day.

Further, the input image may be the heat map in which an hourly use status is represented by one of a vertical axis and a horizontal axis and the per-minute use status at the hour is represented by another axis.

Further, the trained model may include a trained first neural network and a trained second neural network, and the user probability data generation means may be configured to generate the user probability data based on output obtained from the trained model when the input image is input to the trained first neural network and the time-series input data is input to the trained second neural network.

In this aspect, the first neural network may be a convolutional neural network.

Further, the first neural network may be a recursive neural network (RNN).

Further, according to one aspect of the present invention, the anomaly determining system further includes alert generation means for generating an alert regarding the user when it is determined that an anomaly has occurred in the behavior of the user.

Further, according to one aspect of the present invention, the anomaly determining system further includes notification means for giving a notification when it is determined that an anomaly has occurred in the behavior of the user.

Further, according to one embodiment of the present invention, there is provided an anomaly determining method including the steps of: generating, for each of a plurality of periods, based on log data indicating a log of a behavior of a user with respect to a given computer resource for the each of the plurality of periods, input data for the each of the plurality of periods, which is associated with the log data; generating, based on output obtained from a trained model when the input data is input to the trained model, user probability data indicating a probability value of a probability that the log data associated with the input data indicates the log of the behavior of the user; and determining whether an anomaly has occurred in the behavior of the user during a latest period based on the user probability data generated based on the input data for the latest period and the user probability data generated based on the input data for a period before the latest period.

Further, according to one embodiment of the present invention, there is provided a program for causing a computer to execute the procedures of: generating, for each of a plurality of periods, based on log data indicating a log of a behavior of a user with respect to a given computer resource for the each of the plurality of periods, input data for the each of the plurality of periods, which is associated with the log data; generating, based on output obtained from a trained model when the input data is input to the trained model, user probability data indicating a probability value of a probability that the log data associated with the input data indicates the log of the behavior of the user; and determining whether an anomaly has occurred in the behavior of the user during a latest period based on the user probability data generated based on the input data for the latest period and the user probability data generated based on the input data for a period before the latest period.

BRIEF DESCRIPTION OF DRAWINGS

FIG. 8 is a diagram for illustrating an example of a data structure of training data.

FIG. 9 is a diagram for illustrating an example of user probability data.

DESCRIPTION OF EMBODIMENTS

Description is given below in detail of an embodiment of the present invention with reference to the drawings.

Figure 1:
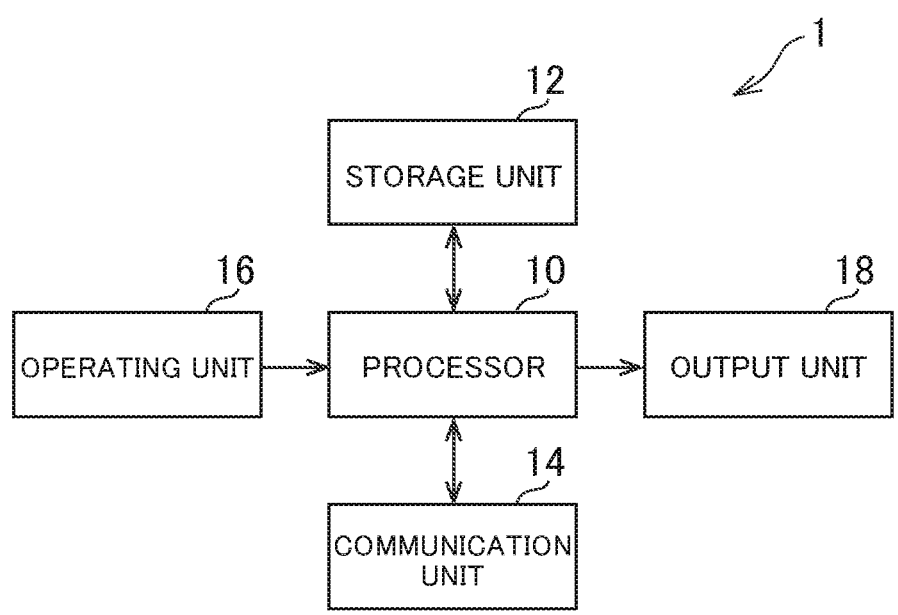
FIG. 1 is a diagram for illustrating an example of an overall configuration of an anomaly determining system according to one embodiment of the present invention.

FIG. 1 is a diagram for illustrating an example of an overall configuration of an anomaly determining system 1 according to the embodiment of the present invention. As illustrated in FIG. 1, the anomaly determining system 1 according to this embodiment is a computer, for example, a server computer or a personal computer, and includes a processor 10, a storage unit 12, a communication unit 14, an operating unit 16, and an output unit 18. The anomaly determining system 1 according to this embodiment may include a plurality of computers.

The processor 10 is, for example, a program-controlled device, such as a microprocessor, which is configured to operate in accordance with a program installed in the anomaly determining system 1. The storage unit 12 is, for example, a storage element, such as a ROM or a RAM, or a solid-state drive (SSD). The storage unit 12 is configured to store, for example, a program to be executed by the processor 10. The communication unit 14 is, for example, a communication interface for wired communication or wireless communication, and is configured to exchange data with another computer or terminal through a computer network, such as the Internet.

The operating unit 16 is an input device, and includes, for example, a pointing device, such as a touch panel or a mouse, or a keyboard. The operating unit 16 is configured to transmit operation content to the processor 10. The output unit 18 is an output device, for example, a display, such as a liquid crystal display unit or an organic EL display unit, or an audio output device, such as a speaker.

Programs and data to be described as being stored into the storage unit 12 may be supplied thereto from another computer via the network. Further, the hardware configuration of the anomaly determining system 1 is not limited to the above-mentioned example, and various types of hardware can be applied thereto. For example, the anomaly determining system 1 may include a reading unit (e.g., an optical disc drive or a memory card slot) configured to read a computer-readable information storage medium, or an input/output unit (e.g., a USB port) configured to input and output data to/from an external device. For example, the program and the data stored in the information storage medium may be supplied to the anomaly determining system 1 through intermediation of the reading unit or the input/output unit.

In this embodiment, for example, various users use a user terminal to perform behaviors including access to a given computer resource, such as a file server, in a corporate network. In this case, examples of the user terminal include a personal computer, a mobile phone, a smartphone, a tablet terminal, and a server.

Then, log data indicating a log of the behavior of the user with respect to a given computer resource, for example, an access log for a given computer resource, is recorded in, for example, a network firewall. Then, in this embodiment, the anomaly determining system 1 accesses the network firewall through intermediation of the communication unit 14 to collect the log data recorded in the network firewall.

In this case, the log data may be collected through use of a user agent or software, for example, CROWDSTRIKE (trademark), which is installed in the anomaly determining system 1.

In this embodiment, it is assumed that, for each piece of log data, the behavior of which user at which date/time is indicated by the log data can be identified through use of an existing program, for example, a text analysis script, which is installed in the anomaly determining system 1.

It is also assumed that identification information (user ID) is assigned in advance to each user in this embodiment. That is, in this embodiment, it is assumed that the user ID of the user who performed the behavior indicated in the log data and a behavior date/time of the behavior can be identified based on the log data.

Figure 2:
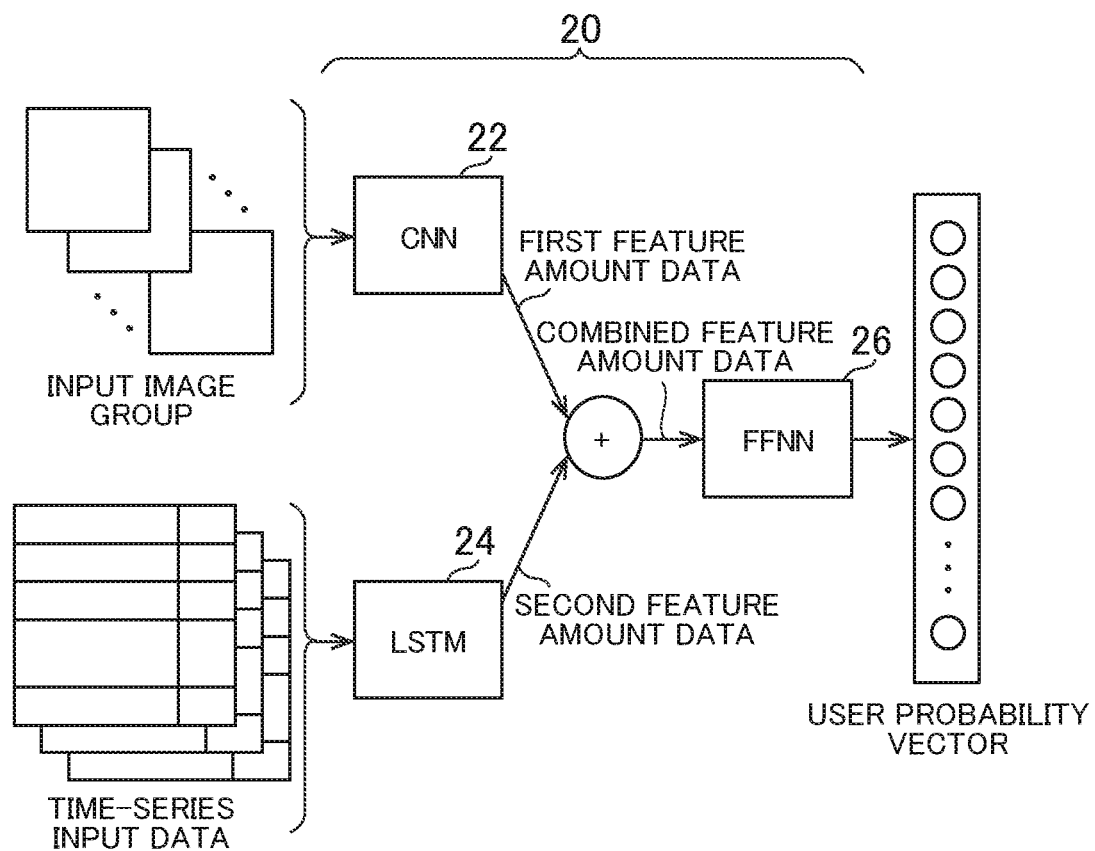
FIG. 2 is a diagram for illustrating an example of a machine learning model.

Then, in this embodiment, for example, a machine learning model 20 illustrated in FIG. 2 is used to determine whether or not an anomaly has occurred in the behavior of the user based on the collected log data. As illustrated in FIG. 2, the machine learning model 20 in this embodiment includes a convolutional neural network (CNN) 22, a long short-term memory (LSTM) 24, and a feed-forward neural network (FFNN) 26. When it is determined that an anomaly has occurred in the behavior of the user, for example, an alert regarding the user is generated.

Further, in this embodiment, before the above-mentioned determination is performed, multimodal learning of the machine learning model 20 is performed. Then, the trained machine learning model 20 (trained model) is used to determine whether or not an anomaly has occurred in the behavior of the user.

Now, functions of the anomaly determining system 1 according to this embodiment and processing to be executed by the anomaly determining system 1 are further described.

Figure 3:
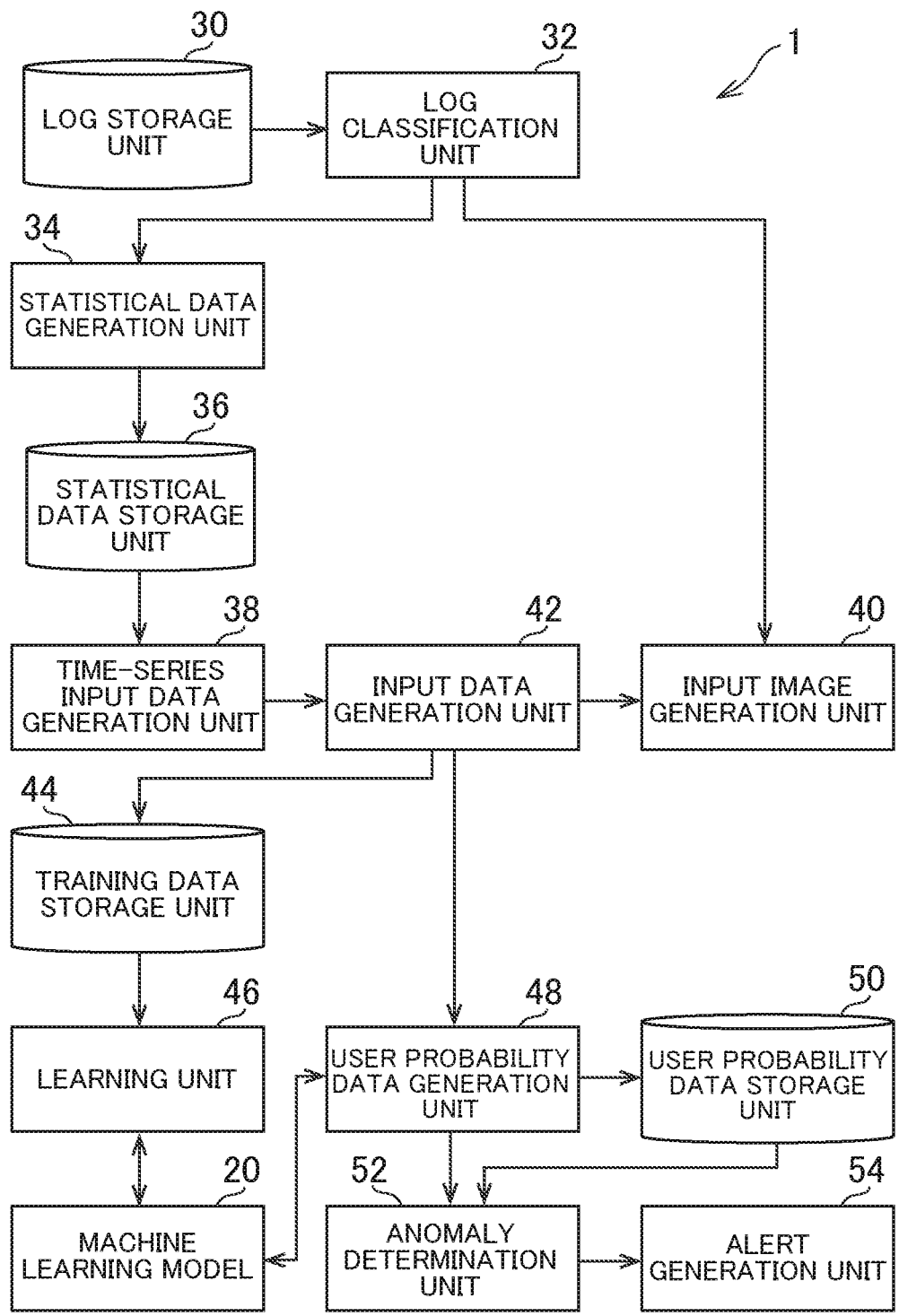
FIG. 3 is a functional block diagram for illustrating an example of functions of the anomaly determining system according to the embodiment of the present invention.

FIG. 3 is a functional block diagram for illustrating an example of the functions implemented by the anomaly determining system 1 according to this embodiment. In the anomaly determining system 1 according to this embodiment, not all the functions illustrated in FIG. 3 are required to be implemented, and a function other than the functions illustrated in FIG. 3 may be implemented.

As illustrated in FIG. 3, the anomaly determining system according to this embodiment functionally includes, for example, the machine learning model 20, a log storage unit 30, a log classification unit 32, a statistical data generation unit 34, a statistical data storage unit 36, a time-series input data generation unit 38, an input image generation unit 40, an input data generation unit 42, a training data storage unit 44, a learning unit 46, a user probability data generation unit 48, a user probability data storage unit 50, an anomaly determination unit 52, and an alert generation unit 54.

The machine learning model 20 is implemented mainly by the processor 10 and the storage unit 12. The log storage unit 30, the statistical data storage unit 36, the training data storage unit 44, and the user probability data storage unit 50 are implemented mainly by the storage unit 12. The log classification unit 32, the statistical data generation unit 34, the time-series input data generation unit 38, the input image generation unit 40, the input data generation unit 42, the learning unit 46, the user probability data generation unit 48, and the anomaly determination unit 52 are implemented mainly by the processor 10. The alert generation unit 54 is implemented mainly by the processor 10, the storage unit 12, and the output unit 18.

As described above, in this embodiment, the learning of the machine learning model 20 is executed before it is determined whether or not an anomaly has occurred in the behavior of the user. The machine learning model 20, the log storage unit 30, the log classification unit 32, the statistical data generation unit 34, the statistical data storage unit 36, the time-series input data generation unit 38, the input image generation unit 40, the input data generation unit 42, the training data storage unit 44, and the learning unit 46 correspond to functions relating to the learning of the machine learning model 20.

Then, the machine learning model 20, the log storage unit 30, the log classification unit 32, the statistical data generation unit 34, the statistical data storage unit 36, the time-series input data generation unit 38, the input image generation unit 40, the input data generation unit 42, the user probability data generation unit 48, the user probability data storage unit 50, the anomaly determination unit 52, and the alert generation unit 54 correspond to functions relating to anomaly determination using the trained machine learning model 20 (trained model).

The above-mentioned functions may be implemented by the processor 10 executing programs including instructions corresponding to the above-mentioned functions, which are installed in the anomaly determining system 1 being a computer. These programs may also be supplied to the anomaly determining system 1, for example, through a computer-readable information storage medium, such as an optical disc, a magnetic disk, a magnetic tape, or a magneto-optical disk, or through the Internet or the like.

In this embodiment, for example, as illustrated in FIG. 2, the machine learning model 20 is a machine learning model including the CNN 22, the LSTM 24, and the FFNN 26.

As illustrated in FIG. 2, in this embodiment, for example, an input image group generated based on the log data, which is described later, is input to the CNN 22, and time-series input data generated based on the log data, which is described later, is input to the LSTM 24.

Then, combined feature amount data obtained by combining first feature amount data being output from the CNN 22 and second feature amount data being output from the LSTM 24 is generated. Then, the combined feature amount data is input to the FFNN 26.

A softmax function is implemented as an activation function of an output layer of the FFNN 26. Output from the FFNN 26 corresponding to the input of the combined feature amount data is referred to as "user probability vector." The user probability vector is a vector having the same number of elements as the number of users to be subjected to the anomaly determination. Each element is associated with the user ID in advance. Then, a probability value having a value of 0 or more and 1 or less, which indicates a probability that the log data may indicate the log of the behavior of the user associated with the element, is set for each element.

Now, the functions relating to the learning of the machine learning model 20 are described.

In this embodiment, the log storage unit 30 is configured to store a plurality of pieces of log data collected from the network firewall.

In this embodiment, for example, the log classification unit 32 is configured to classify a plurality of pieces of log data stored in the log storage unit 30 by user and by behavior date. For example, the log classification unit 32 identifies, for each piece of log data, the user ID of the user who performed the behavior indicated in the log data and the behavior date of the behavior. Then, for example, the log classification unit 32 associates the identified user ID and behavior date data indicating the identified behavior date with the log data.

In this embodiment, for example, the statistical data generation unit 34 is configured to generate, for each of a plurality of users, statistical data indicating statistics of the behavior of the user during a predetermined period (for example, one day) based on the log data indicating the behavior of the user during the predetermined period.

Figure 4:
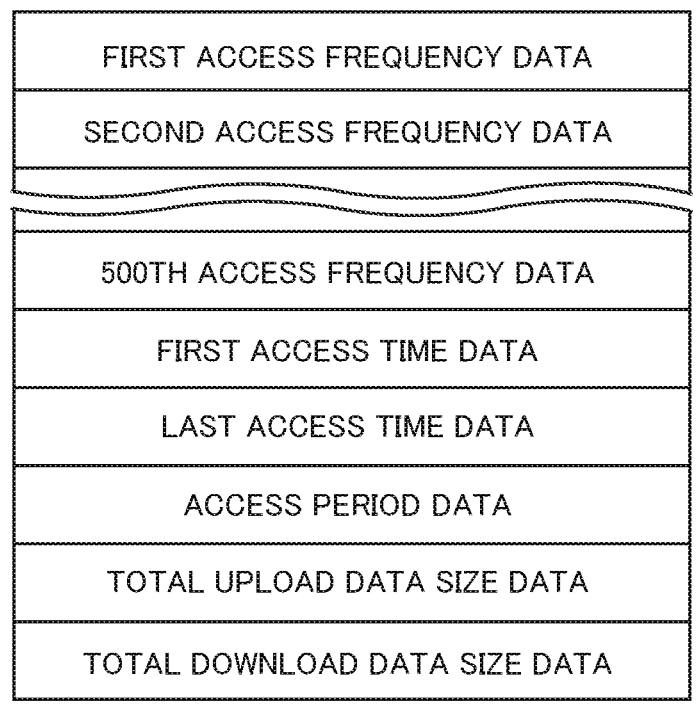
FIG. 4 is a diagram for illustrating an example of a data structure of statistical data.

FIG. 4 is a diagram for illustrating an example of a data structure of the statistical data. As illustrated in FIG. 4, the statistical data includes, for example, a plurality of pieces of access frequency data (in the example of FIG. 4, first access frequency data to 500th access frequency data), first access time data, last access data, access period data, total upload data size data, and total download data size data.

The access frequency data is, for example, data indicating the number of accesses during the period for each of at least one given URL. In this case, for example, 500 given URLs that are generally accessed are set in advance, and the access frequency data indicating the number of accesses to each URL is generated. As a result, the generated statistical data includes 500 pieces of access frequency data.

The first access time data is, for example, data indicating the first access time of access to a given computer resource by the user during the period (for example, the one day).

The last access time data is, for example, data indicating the last access time of access to a given computer resource by the user during the period (for example, the one day).

The access period data is, for example, data indicating an access period of access to a given computer resource by the user during the period (for example, the one day). The access period data indicates, for example, a period from a time (first access time) at which the user first accessed the given computer resource during the period to a time (last access time) at which the user last accessed the computer resource.

The total upload data size data is, for example, data indicating a total size of data uploaded to a given computer resource by the user during the period (for example, the one day).

The total download data size data is, for example, data indicating a total size of data downloaded from a given computer resource by the user during the period (for example, the one day).

For example, the statistical data generation unit 34 identifies at least one piece of log data associated with a combination of a certain user ID and behavior date data indicating a certain behavior date. Then, for example, the statistical data generation unit 34 generates statistical data based on the identified log data. Then, for example, the statistical data generation unit 34 associates the user ID and the behavior date data with the generated statistical data. Then, for example, the statistical data generation unit 34 stores the statistical data associated with the user ID and the behavior date data in the statistical data storage unit 36.

In this embodiment, for example, the statistical data storage unit 36 is configured to store statistical data generated by the statistical data generation unit 34.

Figure 5:
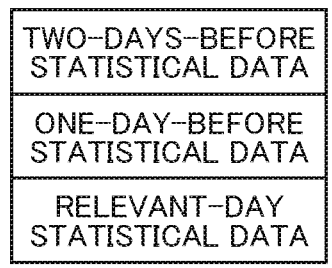
FIG. 5 is a diagram for illustrating an example of a data structure of time-series input data.

In this embodiment, for example, the time-series input data generation unit 38 is configured to generate time-series input data for the period, which includes the statistical data for a plurality of periods up to the period, based on the statistical data stored in the statistical data storage unit 36. In this case, for example, time-series input data including the statistical data for three to five consecutive periods is generated. FIG. 5 is a diagram for illustrating an example of a data structure of the time-series input data. In this case, as an example, it is assumed that time-series input data indicating statistics of the behavior of the user for three days is generated.

In this embodiment, for example, the time-series input data generation unit 38 identifies the statistical data associated with the combination of a certain user ID and the behavior date data indicating a certain behavior date. The statistical data identified in such a manner is referred to as "relevant-day statistical data."

Then, for example, the time-series input data generation unit 38 identifies statistical data associated with a combination of the user ID and behavior date data indicating the day before the behavior date associated with the relevant-day statistical data. The statistical data identified in such a manner is referred to as "one-day-before statistical data."

Then, for example, the time-series input data generation unit 38 identifies statistical data associated with a combination of the user ID and behavior date data indicating the day before the behavior date associated with the one-day-before statistical data. The statistical data identified in such a manner is referred to as "two-days-before statistical data."

Then, for example, the time-series input data generation unit 38 generates time-series input data including the identified two-days-before statistical data, the identified one-day-before statistical data, and the identified relevant-day statistical data. Then, the time-series input data generation unit 38 associates the generated time-series input data with the user ID and the behavior date data indicating the behavior date associated with the relevant-day statistical data included in the time-series input data.

In this embodiment, for example, the input image generation unit 40 is configured to generate, based on the log data on a certain user for a predetermined period (for example, one day), an input image that visualizes the behavior of the user indicated by the log data. In this case, the input image generation unit 40 may generate an input image being an image that visualizes a use status (for example, the number of times of use or the number of accesses) of the user regarding at least one of a given application or a given protocol.

In this embodiment, a label indicating the used application or used protocol is provided to the log data by the network firewall. For that reason, in this embodiment, the input image can be generated based on the label. In this case, an input image corresponding to "others" may be generated based on the log data provided with no label (that is, unable to be classified by the network firewall).

Figure 6:
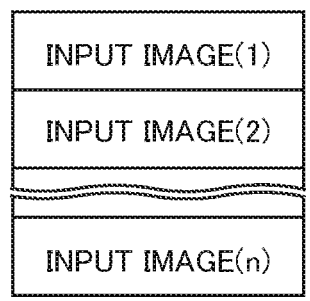
FIG. 6 is a diagram for illustrating an example of a data structure of an input image group.

In addition, the input image generation unit 40 may generate, for a plurality of applications or protocols, input images that visualize use statuses of the applications or the protocols. Then, the input image generation unit 40 may generate an input image group having a data structure illustrated in FIG. 6, which includes the input images generated for the plurality of applications or protocols that are different from one another. As illustrated in FIG. 6, the generated input image group includes "n" input images generated for "n" applications or protocols, respectively. It is also assumed that an order of the applications or protocols associated with the input images in the input image group is defined in advance.

In this embodiment, for example, the input image generation unit 40 identifies pieces of log data associated with combinations of a certain user ID and the behavior date data indicating a certain behavior date. Then, the input image generation unit 40 identifies, based on those pieces of log data, use statuses regarding a predetermined plurality of applications or protocols. Then, the input image generation unit 40 generates an input image group based on the identified use statuses. Then, the input image generation unit 40 associates the user ID and the behavior date data with the generated input image group.

In this case, examples of the application having the use status presented in the input image include a chat application, for example, Microsoft Teams (trademark), an email application, for example, Microsoft Outlook (trademark), Microsoft (trademark) Update, Sharepoint (trademark), Slack (trademark), Dropbox (trademark), Viber (trademark), and so on.

In addition, examples of the protocol having the use status presented in the input image include a secure sockets layer (SSL), a domain name system (DNS), a hypertext transfer protocol (HTTP), a simple mail transfer protocol (SMTP), and so on.

Figure 7:
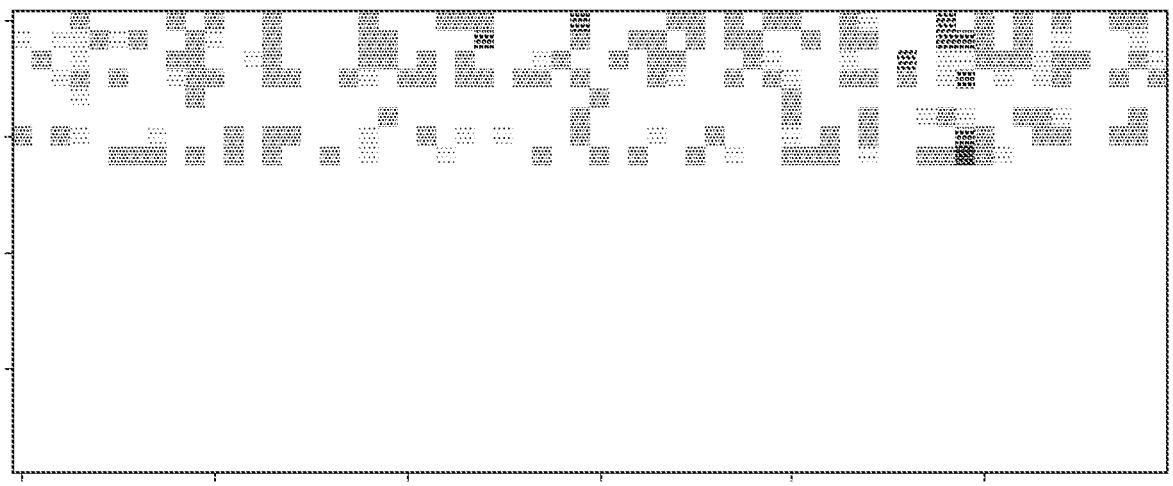
FIG. 7 is a diagram for schematically illustrating an example of an input image.

FIG. 7 is a diagram for schematically illustrating an example of the input image in this embodiment. The input image exemplified in FIG. 7 is a heat map that visualizes a per-minute use status on one day regarding a specific application or a specific protocol.

The input image illustrated in FIG. 7 includes a total of 1,440 small images of 24 vertically by 60 horizontally. The small image may be an image (namely, a pixel) formed of one pixel. In addition, each small image may have the same size and shape. Each small image is associated with one minute. For example, the upper left small image included in the input image is associated with 0:00, and the small image being the seventh from the top and the eleventh from the left is associated with 6:10. In this manner, the input image in this embodiment may be a heat map in which an hourly use status is represented by one of the vertical and horizontal axes and the per-minute use status at the hour is represented by the other axis.

In the input image, it is not required to represent the hourly use status by the vertical axis and represent the per-minute use status at the hour by the horizontal axis, and it is possible to represent the hourly use status by the horizontal axis and represent the per-minute use status at the hour by the vertical axis.

In addition, the small image has a pixel value corresponding to the use status for one minute associated with the small image. In this case, for example, as the small image corresponding to one minute has a higher use status, the small image has a color closer to black, and as the small image corresponding to one minute has a lower use status, the small image has a color closer to white. The input image may be a monochrome image, or may be a color image. When the input image is a color image, the color of the small image may correspond to the use status in place of shades of gray of the small image.

In this embodiment, for example, the input data generation unit 42 is configured to generate, for each of a plurality of periods, based on the log data for the period, training data for the period, which is associated with the log data.

FIG. 8 is a diagram for illustrating an example of a data structure of training data to be generated at a time of the learning of the machine learning model 20. In this embodiment, for example, a plurality of pieces of training data associated with respective combinations of the user ID and the behavior date are generated. Each piece of training data associated with each combination of the user ID and the behavior date includes, for example, the user ID, the behavior date data indicating the behavior date, and the input data. The input data includes: the input image group associated with the user ID and the behavior date data; and the time-series input data associated with the user ID and the behavior date data.

At the time of the learning of the machine learning model 20, the input data generation unit 42 stores the generated training data in the training data storage unit 44.

In this embodiment, for example, a large number of pieces of training data associated with various user IDs and various behavior dates are stored in the training data storage unit 44.

In this embodiment, for example, the learning unit 46 is configured to execute the learning of the machine learning model 20 through use of the training data stored in the training data storage unit 44.

For example, the learning unit 46 inputs the input image group included in the training data to the CNN 22, and inputs the time-series input data included in the training data to the LSTM 24.

Then, the learning unit 46 generates combined feature amount data obtained by combining the first feature amount data being the output from the CNN 22, which corresponds to the input of the input image group, and the second feature amount data being the output from the LSTM 24, which corresponds to the input of the time-series input data.

Then, the learning unit 46 inputs the combined feature amount data to the FFNN 26.

Then, the learning unit 46 generates a teacher vector associated with the user ID included in the training data. The teacher vector is a vector having the same number of elements as the number of user probability vectors. Then, a teacher vector having a value of "1" set for an element associated with the user ID included in the training data and having a value of "0" set for the other elements is generated.

Then, for example, the learning unit 46 determines a difference between the user probability vector being the output from the FFNN 26, which corresponds to the input of the combined feature amount data, and the generated teacher vector. Then, the learning unit 46 executes supervised learning for updating the value of a parameter of each layer of the machine learning model 20 by an error back-propagation method so as to minimize the value of a loss function associated with the identified difference.

The learning of the machine learning model 20 in this embodiment is executed by executing the above-mentioned learning for a plurality of pieces of training data. Then, the trained machine learning model 20 generated in such a manner includes the trained CNN 22, the trained LSTM 24, and the trained FFNN 26.

Now, description is given of functions relating to determination as to whether or not an anomaly has occurred in the behavior of the user through use of the trained machine learning model 20 (trained model).

In the following description, as an example, the determination as to whether or not an anomaly has occurred in the behavior of a user having a user ID of "0001" is described, but it should be understood that the same determination can be performed for other users.

In addition, in this embodiment, the determination as to whether or not an anomaly has occurred in the behavior of the user is repeatedly performed for a plurality of determination target periods (for example, a plurality of determination target dates).

For example, it is assumed that the log storage unit 30 stores, when each iteration of the determination is performed, at least pieces of log data collected from two days before the determination target date for the determination up to the determination target date.

The log classification unit 32 extracts pieces of log data indicating the behavior of the user having the user ID of "0001" from among the pieces of log data stored in the log storage unit 30. Then, the log classification unit 32 extracts, from among those extracted pieces of log data, pieces of log data indicating the behavior from two days before the determination target date up to the determination target date.

Then, the statistical data generation unit 34 generates statistical data associated with each of three days from two days before the determination target date up to the determination target date.

Then, the time-series input data generation unit 38 generates time-series input data including the statistical data for two days before the determination target date as the two-days-before statistical data, including the statistical data for one day before the determination target date as the one-day-before statistical data, and including the statistical data for the determination target date as the relevant-day statistical data.

Then, the input image generation unit 40 generates an input image group based on the log data for the determination target date.

Then, the input data generation unit 42 generates input data including the generated time-series input data and the generated input image group.

In this embodiment, for example, the user probability data generation unit 48 is configured to generate, based on output obtained from the trained model when the input data is input to the trained model, user probability data indicating the probability value of the probability that the log data associated with the input data may indicate the log of the behavior of the user.

For example, the user probability data generation unit 48 inputs the input image group included in the generated input data to the trained CNN 22, and inputs the time-series input data included in the input data to the trained LSTM 24.

Then, the user probability data generation unit 48 generates combined feature amount data obtained by combining the first feature amount data being the output from the CNN 22, which corresponds to the input of the input image group, and the second feature amount data being the output from the LSTM 24, which corresponds to the input of the time-series input data.

Then, the user probability data generation unit 48 inputs the combined feature amount data to the FFNN 26.

Then, for example, the user probability data generation unit 48 generates user probability data exemplified in FIG. 9 based on the user probability vector being the output from the FFNN 26, which corresponds to the input of the combined feature amount data.

The user probability data includes the user ID of the user, the behavior date data indicating the determination target date, and probability value data indicating a value (probability value) of the element associated with the user in the user probability vector. In the probability value data illustrated in FIG. 9, the probability value is expressed as a percentage in place of a value of 0 or more and 1 or less.

Then, the user probability data generation unit 48 stores the generated user probability data in the user probability data storage unit 50.

In this embodiment, as described above, the input data generation unit 42 generates, for each of a plurality of determination target periods, input data for the determination target period, which is associated with the log data, based on the log data for the determination target period. Then, the user probability data generation unit 48 generates, for each of the plurality of determination target periods, user probability data indicating the probability value of the probability that the log data associated with the input data may indicate the log of the behavior of the user based on the output obtained from the trained model when the input data for the determination target period is input to the trained model. Then, the generated user probability data is accumulated in the user probability data storage unit 50.

In this manner, for example, for each of the plurality of determination target periods (for example, the plurality of determination target dates), the user probability data generated based on the log data for the determination target period (for example, the determination target date) is accumulated in the user probability data storage unit 50.

In this embodiment, for example, the anomaly determination unit 52 is configured to determine whether or not an anomaly has occurred in the behavior of the user during a latest period based on the user probability data generated based on the input data for the latest period and the user probability data generated based on the input data for a period before the latest period.

In this case, the anomaly determination unit 52 may determine whether or not an anomaly has occurred in the behavior of the user based on whether or not a difference between the probability value indicated by the user probability data for the latest period and the probability value indicated by the user probability data for a period immediately before the period is larger than a predetermined threshold value.

For example, it is assumed that the predetermined threshold value is 15%, and the latest period is Sep. 10, 2020. In this case, it is assumed that the value of the probability value data included in the user probability data for Sep. 9, 2020 regarding the user having the user ID of "0001" is 60%. It is also assumed that the value of the probability value data included in the user probability data for September 10 is 40%. In this case, it is determined that an anomaly has occurred in the behavior of the user having the user ID of "0001" on Sep. 10, 2020.

Meanwhile, it is assumed that the value of the probability value data included in the user probability data for Sep. 9, 2020 is 60%. It is also assumed that the values of the probability value data included in the user probability data for September 10 to September 13 are 55%, 50%, 45%, and 40%, respectively. In this case, it is determined that no anomaly has occurred in the behavior of the user having the user ID of "0001" on any one of Sep. 10 to 13, 2020.

The anomaly determination unit 52 may also determine whether or not an anomaly has occurred in the behavior of the user based on the probability value indicated by the user probability data for the latest period and a representative value of the probability values indicated by the user probability data for a predetermined number of periods before the period. For example, it may be determined whether or not an anomaly has occurred in the behavior of the user based on whether or not a difference between the probability value indicated by the user probability data for the latest period and the above-mentioned representative value is larger than a predetermined threshold value.

For example, it is assumed as well that the predetermined threshold value is 15%. In this case, it is assumed that an average value of the values of the probability value data included in the user probability data for Sep. 7 to 9, 2020 regarding the user having the user ID of "0001" is 60%. It is also assumed that the value of the probability value data included in the user probability data for September 10 is 40%. In this case, it is determined that an anomaly has occurred in the behavior of the user having the user ID of "0001" on Sep. 10, 2020.

Meanwhile, it is assumed that the average value of the values of the probability value data included in the user probability data for Sep. 7 to 9, 2020 is 50%. It is also assumed that the value of the probability value data included in the user probability data for September 10 is 40%. In this case, it is determined that no anomaly has occurred in the behavior of the user having the user ID of "0001" on Sep. 10, 2020.

In the above-mentioned example, the predetermined number of periods are three periods, but the predetermined number is not limited to three. In addition, in the above-mentioned example, it is determined whether or not an anomaly has occurred in the behavior of the user based on the average value, but it may be determined whether or not an anomaly has occurred in the behavior of the user based on another representative value (for example, a maximum value, a minimum value, a median value, or a mode value).

In another case, the representative value may be calculated through use of various statistical methods including a simple moving average, an exponential moving average, and a decaying moving average.

In addition, it is not required to determine whether or not an anomaly has occurred in the behavior of the user based on the probability value indicated by the user probability data for the period immediately before the latest period. For example, it may be determined whether or not an anomaly has occurred in the behavior of the user based on the representative value of the values of the probability value data included in the user probability data for "m" periods before the latest period up to "n" periods before the latest period. In addition, a moving window, an increasing moving window, or a similar method may be used for comparison of the probability values.

In the above-mentioned example, a unit period (for example, one day) for aggregation of the input image or the time-series input data and a period (for example, one day) of a determination interval match each other, but the unit period for the aggregation and the period of the determination interval are not required to match each other. For example, for the plurality of determination target periods, there may be an overlap in at least a part of the period for the aggregation of the input image or the time-series input data. For example, the input image and the relevant-day statistical data are generated based on the log data for one day immediately before a timing at which the anomaly determination is performed, but the interval of the anomaly determination may be a period (for example, one hour) shorter than one day or may be a period (for example, three days) longer than one day.

In this embodiment, for example, the alert generation unit 54 is configured to generate an alert regarding the user when it is determined that an anomaly has occurred in the behavior of the user. For example, when it is determined that an anomaly has occurred in the behavior of the user having the user ID of "0001" on Sep. 10, 2020, alert data including the behavior date data indicating the user ID and the behavior date (Sep. 10, 2020) may be generated. Then, the alert generation unit 54 may store the generated alert data in the storage unit 12.

The alert generation unit 54 may also give a notification when it is determined that an anomaly has occurred in the behavior of the user. In this case, for example, when the alert data is generated, the alert generation unit 54 may give a notification to that effect, such as displaying an alert or outputting an alert sound, through intermediation of the output unit 18.

In this case, an example of a flow of the learning processing to be performed by the anomaly determining system 1 according to this embodiment is described with reference to a flow chart exemplified in FIG. 10. In this processing example, it is assumed that the log data used for the learning of the machine learning model 20 is stored in advance in the log storage unit 30.

First, the log classification unit 32 classifies the log data stored in the log storage unit 30, and associates the user ID and the behavior date data with each piece of log data (Step S101).

Then, the statistical data generation unit 34 generates a plurality of pieces of statistical data each associated with the user ID and the behavior date data based on the log data subjected to the execution of the processing illustrated in Step S101, and stores the generated statistical data in the statistical data storage unit 36 (Step S102).

Then, the time-series input data generation unit 38 generates a plurality of pieces of time-series input data each associated with the user ID and the behavior date data based on the statistical data stored in the statistical data storage unit 36 in the processing illustrated in Step S102 (Step S103).

Then, the input image generation unit 40 generates a plurality of input image groups each associated with the user ID and the behavior date data based on the log data subjected to the execution of the processing illustrated in Step S101 (Step S104).

Then, the input data generation unit 42 generates a plurality of pieces of training data based on the time-series input data generated in the processing illustrated in Step S103 and the input image groups generated in the processing illustrated in Step S104, and stores the generated training data in the training data storage unit 44 (Step S105).

Then, the learning unit 46 selects, from among the pieces of training data stored in the training data storage unit 44, a piece of training data that has not been subjected to the execution of the processing illustrated in Step S107 (Step S106).

Then, the learning unit 46 executes the learning processing for causing the machine learning model 20 to learn the piece of training data selected in the processing illustrated in Step S106 (Step S107).

Then, the learning unit 46 examines whether or not the processing illustrated in Step S107 has been executed for all the pieces of training data stored in the training data storage unit 44 (Step S108).

When it is determined that the processing illustrated in Step S107 has not been executed for all the pieces of training data (N in Step S108), the procedure returns to the processing illustrated in Step S106.

When it is determined that the processing illustrated in Step S107 has been executed for all the pieces of training data (Y in Step S108), the processing illustrated in this processing example is brought to an end.

Figure 10:
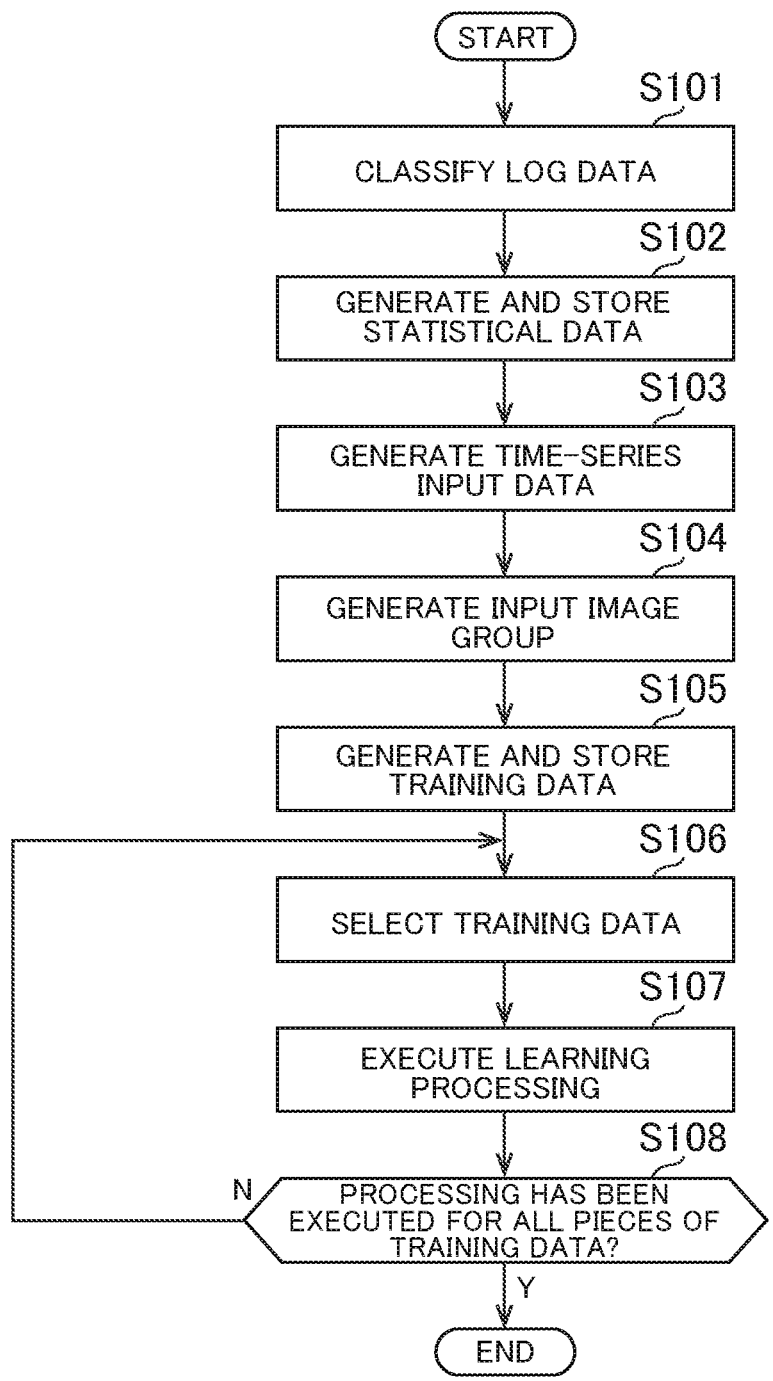
FIG. 10 is a flow chart for illustrating an example of a flow of learning processing to be performed by the anomaly determining system according to the embodiment of the present invention.

The order of the processing steps illustrated in FIG. 10 is not particularly limited. For example, the processing illustrated in Step S104 may be executed before the processing illustrated in Step S102 and Step S103.

Next, an example of a flow of the anomaly determining processing to be performed for a certain user by the anomaly determining system 1 according to this embodiment is described with reference to a flow chart illustrated in FIG. 11. In this processing example, it is assumed that the machine learning model 20 has been trained in advance, and the user probability data to be compared with the latest user probability data is already stored in the user probability data storage unit 50. In addition, in this processing example, it is assumed that pieces of log data are collected as appropriate.

First, the log classification unit 32 monitors arrival of a timing to perform the anomaly determination (Step S201). Examples of the timing to perform the anomaly determination include a predetermined time on each day.

When the timing to perform the anomaly determination has arrived, the log classification unit 32 classifies the pieces of log data stored in the log storage unit 30, and associates the user ID and the behavior date data with each piece of log data (Step S202). In this case, the user ID and the behavior date data may be associated with the log data with which the user ID and the behavior date data have not been associated. In another case, at this timing, the log classification unit 32 may collect the latest piece of log data, and associate the collected piece of log data with the user ID and the behavior date data.

Then, the log classification unit 32 extracts the log data satisfying a predetermined condition (Step S203). In this case, for example, the log data associated with the user ID of the user to be subjected to the anomaly determination and the behavior date data indicating any one of behavior dates from two days before the relevant day to the relevant day are extracted.

Then, the statistical data generation unit 34 generates statistical data for three days based on the log data extracted in the processing illustrated in Step S203, and stores the generated statistical data in the statistical data storage unit 36 (Step S204).

Then, the time-series input data generation unit 38 generates time-series input data associated with the user ID and the behavior date data based on the statistical data stored in the statistical data storage unit 36 in the processing illustrated in Step S204 (Step S205).

Then, the input image generation unit 40 generates an input image group based on the log data associated with the behavior date data indicating the relevant day among the pieces of log data extracted in the processing illustrated in Step S203 (Step S206).

Then, the input data generation unit 42 generates input data including the time-series input data generated in the processing illustrated in Step S205 and the input image group generated in the processing illustrated in Step S206 (Step S207).

Then, the user probability data generation unit 48 generates the user probability data, and stores the generated user probability data in the user probability data storage unit 50 (Step S208). In the processing illustrated in Step S208, for example, the user probability data generation unit 48 inputs the input data generated in the processing illustrated in Step S207 to the trained machine learning model 20. Then, the user probability data generation unit 48 acquires the user probability vector being the output from the machine learning model 20 corresponding to the input. Then, the user probability data generation unit 48 generates user probability data based on the acquired user probability vector. Then, the user probability data generation unit 48 stores the generated user probability data in the user probability data storage unit 50.

Then, the anomaly determination unit 52 determines whether or not an anomaly has occurred in the behavior of the user based on the user probability data newly generated in the processing illustrated in Step S208 and the user probability data that has already been stored in the user probability data storage unit 50 (Step S209).

Then, the alert generation unit 54 examines whether or not it is determined in the processing illustrated in Step S209 that an anomaly has occurred (Step S210).

When it is determined that an anomaly has occurred (Y in Step S210), the alert generation unit 54 generates an alert regarding the user (Step S211).

When the processing illustrated in Step S211 is ended, or when it is determined in the processing illustrated in Step S210 that no anomaly has occurred (N in Step S210), the procedure returns to the processing illustrated in Step S201.

Figure 11:
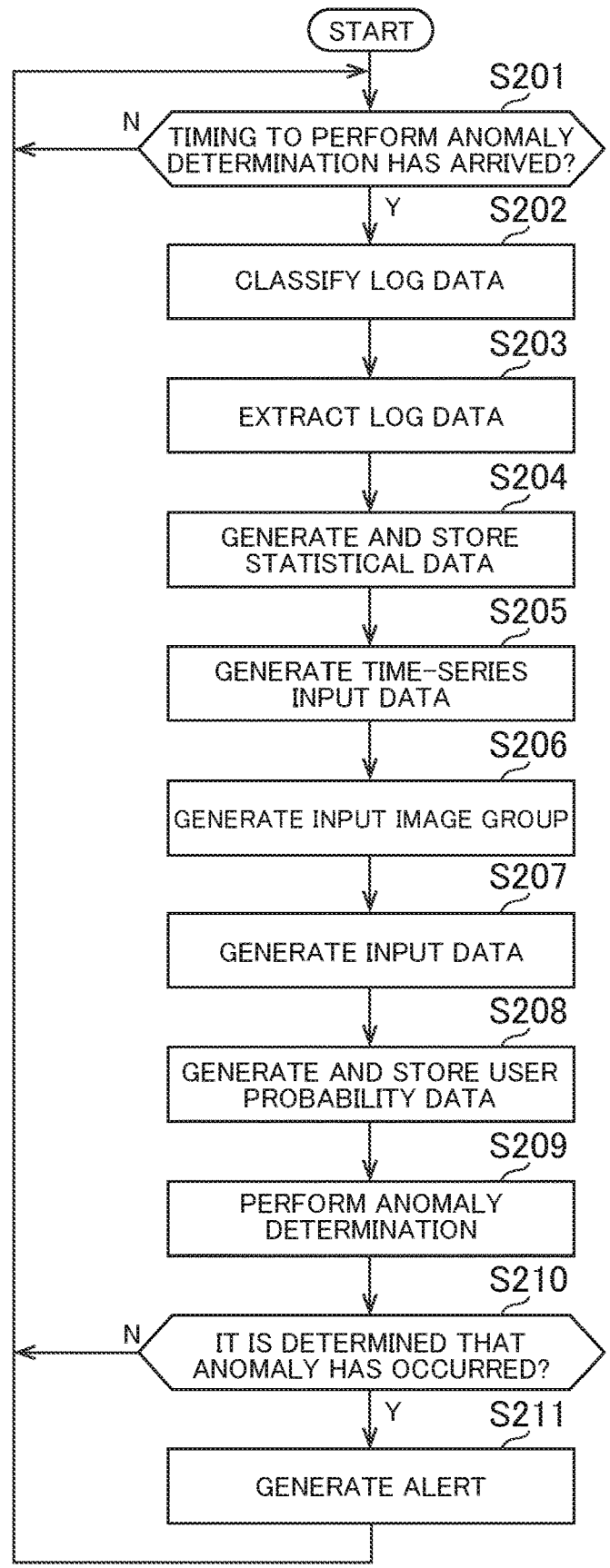
FIG. 11 is a flow chart for illustrating an example of a flow of anomaly determining processing to be performed by the anomaly determining system according to the embodiment of the present invention.

The order of the processing steps illustrated in FIG. 11 is not particularly limited. For example, the processing illustrated in Step S206 may be executed before the processing illustrated in Step S204 and Step S205.

In FIG. 11, an example of the flow of the anomaly determining processing for a certain user is illustrated. However, in this embodiment, for example, this anomaly determining processing is executed in the same manner for all the users to be subjected to the determination. In this manner, in this embodiment, it is possible to determine, for various users who use a given computer resource, the occurrence of an anomaly in the behaviors of such users.

In this embodiment, for example, it is conceivable to determine whether or not an anomaly has occurred in the behavior of the user based on the probability value indicated by a single piece of user probability data.

However, while the user uses a computer resource on a daily basis, it is naturally possible to cause a gradual and slow change in the behavior of the user.

Then, in the determination based on the probability value indicated by the single piece of user probability data, consideration is not given to whether the output is generated by a sudden change in the behavior of the user or is finally reached as a result of the gradual and slow change in the behavior of the user.

For that reason, there is such a fear that it may be erroneously determined that an anomaly has occurred in the behavior of the user even under a state in which the behavior of the user has changed gradually and slowly. For example, it is assumed that the probability value for the user has reached 30% as a result of the gradual and slow change in the behavior of the user. In this case, for example, when the anomaly is determined in a case in which the probability value indicated by the single piece of user probability data is lower than 50%, there is such a fear that it may be erroneously determined that an anomaly has occurred in the behavior of the user. Meanwhile, in this embodiment, under such a situation, it is not determined that an anomaly has occurred, and hence it is more likely to be able to properly determine an anomaly in the behavior regarding the user.

In this manner, according to this embodiment, it is possible to properly determine the occurrence of an anomaly in the behavior of the user.

It should be noted that the present invention is not limited to the above-mentioned embodiment.

For example, in this embodiment, the above-mentioned log data may be recorded in various devices including the network firewall, a router, and a switch. Then, in this embodiment, the anomaly determining system 1 may access those devices through intermediation of the communication unit 14 and collect the log data recorded in those devices. Then, the log storage unit 30 may store the log data collected from the various devices. Then, it may be determined based on the log data collected from the various devices whether or not an anomaly has occurred in the behavior of the user.

Further, the URLs for which the number of accesses is indicated by the access frequency data may be specific URLs or URLs that are not generally accessed (that are rarely accessed), which are not generally accessed URLs. Further, the URLs for which the number of accesses is indicated by the access frequency data may be generally accessed URLs and specific URLs or URLs that are not generally accessed (that are rarely accessed).

Further, a feature amount different from the time-series input data or the input image may be input to the machine learning model 20. In this case, another neural network may be coupled to a multimodal pipeline, for example, the FFNN 26.

Further, the collection of log data may be executed by the anomaly determining system 1 or may be executed by a computer system other than the anomaly determining system 1.

Further, a sigmoid function may be implemented as the activation function of the output layer of the FFNN 26. In this case, the number of sigmoid functions to be required corresponds to the number of users to be subjected to the anomaly determination, and hence a plurality of neural networks in which a plurality of sigmoid functions are implemented may be included in the machine learning model 20.

Further, in place of the LSTM, the machine learning model 20 may include a neural network (for example, a recursive neural network (RNN), such as a gated recurrent unit (GRU), or a simple FFNN) other than the LSTM. Then, the time-series input data may be input to the neural network.

Further, information corresponding to the 1,440 small images (or pixels) included in the input image may be expressed as a one-dimensional vector of 1×1,440 in place of the two-dimensional image. Then, in place of the CNN, the machine learning model 20 may include a neural network other than the CNN. Then, a one-dimensional vector of 1×1,440 may be input to the neural network. Further, information on the input image may be embedded in the one-dimensional information through use of an embedded expression often used in natural language processing (NLP).

Further, the machine learning model 20 may be formed of one type of neural network, and the time-series input data and input images may be input to the neural network. For example, information on a one-dimensional vector corresponding to the input images may be input to the LSTM together with the time-series input data. Further, information indicated in the time-series input data may be expressed by an image, and then the image may be input to the CNN together with the input images. In this manner, the machine learning model 20 in this embodiment is not always limited to the multimodal machine learning model. However, the machine learning model 20 being a multimodal machine learning model can perform the anomaly determination with higher accuracy than the machine learning model 20 that is not a multimodal machine learning model.

Further, in this embodiment, it is not required to train the machine learning model 20 in the anomaly determining system 1, and a trained model may be installed in the anomaly determining system 1 to perform the anomaly determination using the trained model in the anomaly determining system 1.

Further, the specific character strings and numerical values described above and the specific numerical values and character strings in the drawings are merely exemplary, and the present invention is not limited to those character strings and numerical values.

The invention claimed is:

1. An anomaly determining system, comprising:
at least one processor; and
at least one memory device storing instructions which, when executed by the at least one processor, cause the at least one processor to perform operations comprising:
generating, for each of a plurality of periods, based on log data indicating a log of a behavior of a user with respect to a given computer resource for the each of the plurality of periods, user input data for the each of the plurality of periods, which is associated with the log data;
wherein the user input data is not training data;
generating, based on output obtained from a trained model when the user input data is input to the trained model, user probability data indicating a probability value of a probability that the log data associated with the user input data indicates the log of the behavior of the user; and
determining whether an anomaly has occurred in the behavior of the user during a latest period based on the user probability data generated based on the user input data for the latest period and the user probability data generated based on the user input data for a period before the latest period.

2. The anomaly determining system according to claim 1, wherein the determining comprises determining whether an anomaly has occurred in the behavior of the user based on whether a difference between a probability value indicated by the user probability data for the latest period and a probability value indicated by the user probability data for a period immediately before the period is larger than a predetermined threshold value.

3. The anomaly determining system according to claim 1, wherein the determining comprises determining whether an anomaly has occurred in the behavior of the user based on a probability value indicated by the user probability data for the latest period and a representative value of probability values indicated by pieces of user probability data for a predetermined number of periods before the period.

4. The anomaly determining system according to claim 3, wherein the determining comprises determining whether an anomaly has occurred in the behavior of the user based on whether a difference between the probability value indicated by the user probability data for the latest period and the representative value is larger than a predetermined threshold value.

5. The anomaly determining system according to claim 1, wherein the operations further comprise:
   generating statistical data indicating statistics of the behavior of the user during the period based on the log data for the period; and
   generating time-series user input data for the period, which includes the statistical data for a plurality of periods up to the period,
   wherein the generating user input data comprises generating the user input data for the period, which includes the time-series user input data for the period.

6. The anomaly determining system according to claim 5, wherein the generating statistical data comprises generating the statistical data indicating at least one of access frequency data indicating a number of accesses during the period for each of at least one given URL, first access time data indicating a first access time of access to the computer resource during the period, last access time data indicating a last access time of access to the computer resource during the period, access period data indicating an access period of access to the computer resource during the period, total upload data size data indicating a total size of data uploaded to the computer resource during the period, or total download data size data indicating a total size of data downloaded from the computer resource during the period.

7. The anomaly determining system according to claim 5, wherein the generating user input data comprises generating the user input data for the period, which further includes an input image that visualizes the behavior of the user indicated by the log data, which is generated based on the log data for the period.

8. The anomaly determining system according to claim 7, wherein the input image comprises an image that visualizes a use status of the user regarding at least one of a given application or a given protocol.

9. The anomaly determining system according to claim 7, wherein the trained model includes a trained first neural network and a trained second neural network, and
   wherein the generating user probability data comprises generating the user probability data based on output obtained from the trained model when the input image is input to the trained first neural network and the time-series user input data is input to the trained second neural network.

10. The anomaly determining system according to claim 9, wherein the first neural network comprises a convolutional neural network.

11. The anomaly determining system according to claim 9, wherein the second neural network comprises a recursive neural network (RNN).

12. The anomaly determining system according to claim 8, wherein the input image comprises a heat map that visualizes a per-minute use status on one day.

13. The anomaly determining system according to claim 12, wherein the input image comprises the heat map in which an hourly use status is represented by one of a vertical axis and a horizontal axis and the per-minute use status at the hour is represented by another axis.

14. The anomaly determining system according to claim 1, wherein the operations further comprise generating an alert regarding the user when it is determined that an anomaly has occurred in the behavior of the user.

15. The anomaly determining system according to claim 1, wherein the operations further comprise giving a notification when it is determined that an anomaly has occurred in the behavior of the user.

16. An anomaly determining method, comprising the steps of:
   generating, for each of a plurality of periods, based on log data indicating a log of a behavior of a user with respect to a given computer resource for the each of the plurality of periods, user input data for the each of the plurality of periods, which is associated with the log data;
   wherein the user input data is not training data;
   generating, based on output obtained from a trained model when the user input data is input to the trained model, user probability data indicating a probability value of a probability that the log data associated with the user input data indicates the log of the behavior of the user; and
   determining whether an anomaly has occurred in the behavior of the user during a latest period based on the user probability data generated based on the user input data for the latest period and the user probability data generated based on the user input data for a period before the latest period.

17. A non-transitory computer readable information storage medium storing a program for causing a computer to execute the procedures of:
   generating, for each of a plurality of periods, based on log data indicating a log of a behavior of a user with respect to a given computer resource for the each of the plurality of periods, user input data for the each of the plurality of periods, which is associated with the log data;
   wherein the user input data is not training data;
   generating, based on output obtained from a trained model when the user input data is input to the trained model, user probability data indicating a probability value of a probability that the log data associated with the user input data indicates the log of the behavior of the user; and
   determining whether an anomaly has occurred in the behavior of the user during a latest period based on the user probability data generated based on the user input data for the latest period and the user probability data generated based on the user input data for a period before the latest period.

* * * * *